Aug. 5, 1958  G. D. CARLSON  2,846,049
CLOTHES CONVEYOR
Filed April 19, 1955  5 Sheets-Sheet 1

INVENTOR.
GUNNARD D. CARLSON
BY Talbert Dick & Adler
ATTORNEYS.

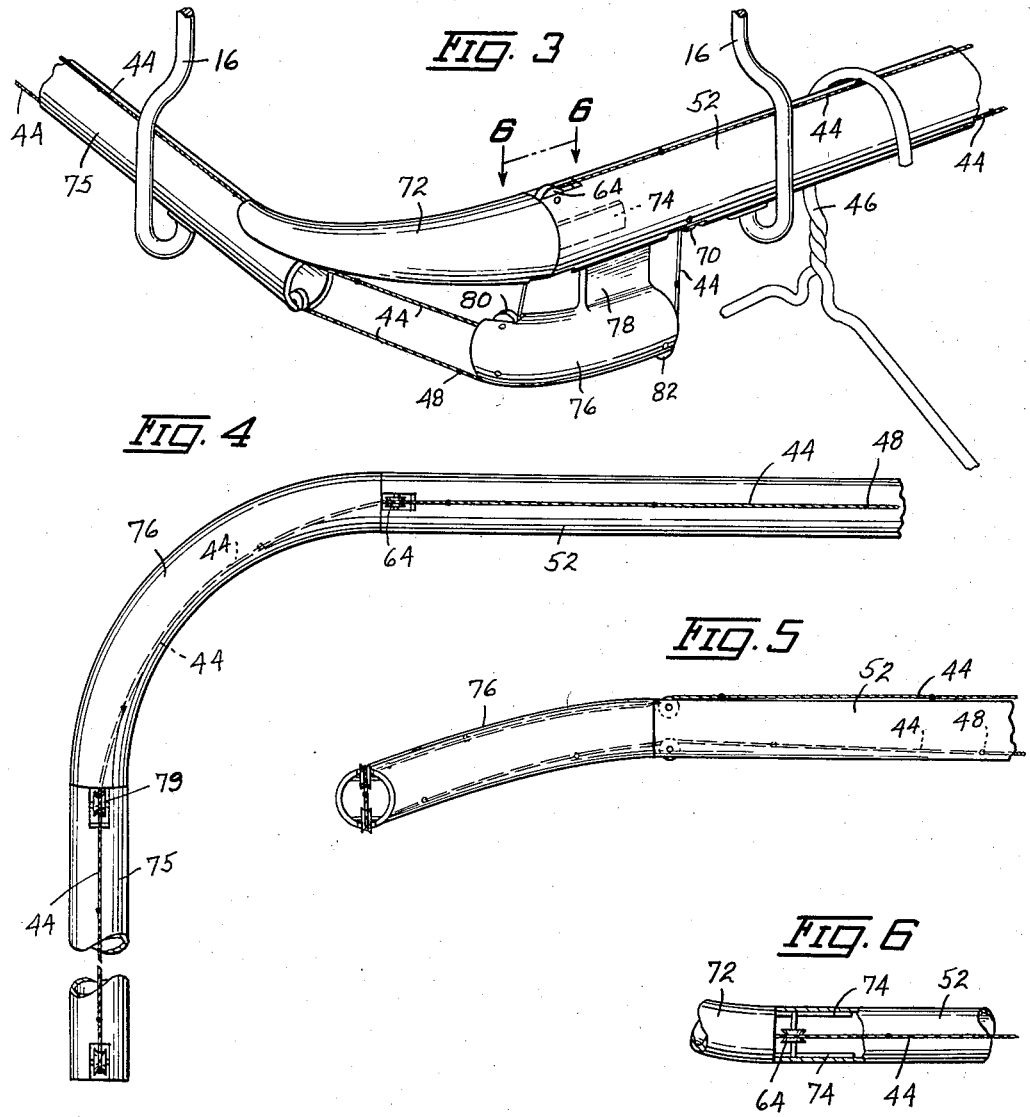

Aug. 5, 1958  G. D. CARLSON  2,846,049
CLOTHES CONVEYOR
Filed April 19, 1955  5 Sheets-Sheet 3
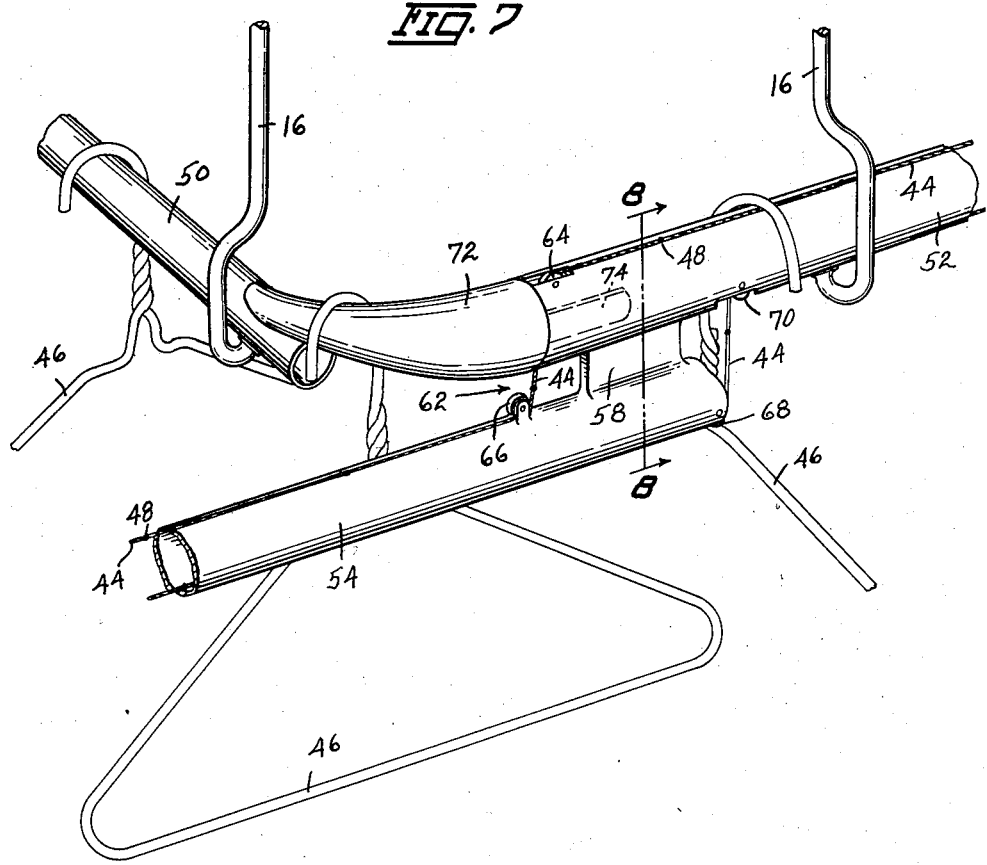
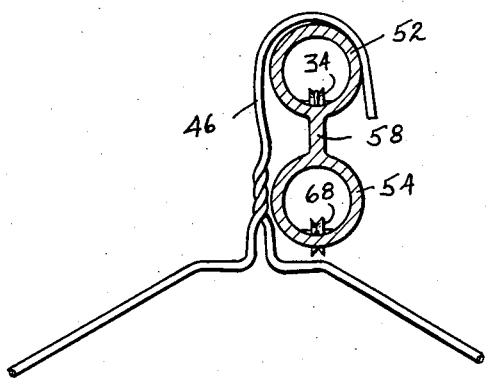
INVENTOR.
GUNNARD D. CARLSON
BY Talbert Dick & Adler
ATTORNEYS.

Aug. 5, 1958  G. D. CARLSON  2,846,049
CLOTHES CONVEYOR
Filed April 19, 1955  5 Sheets-Sheet 4
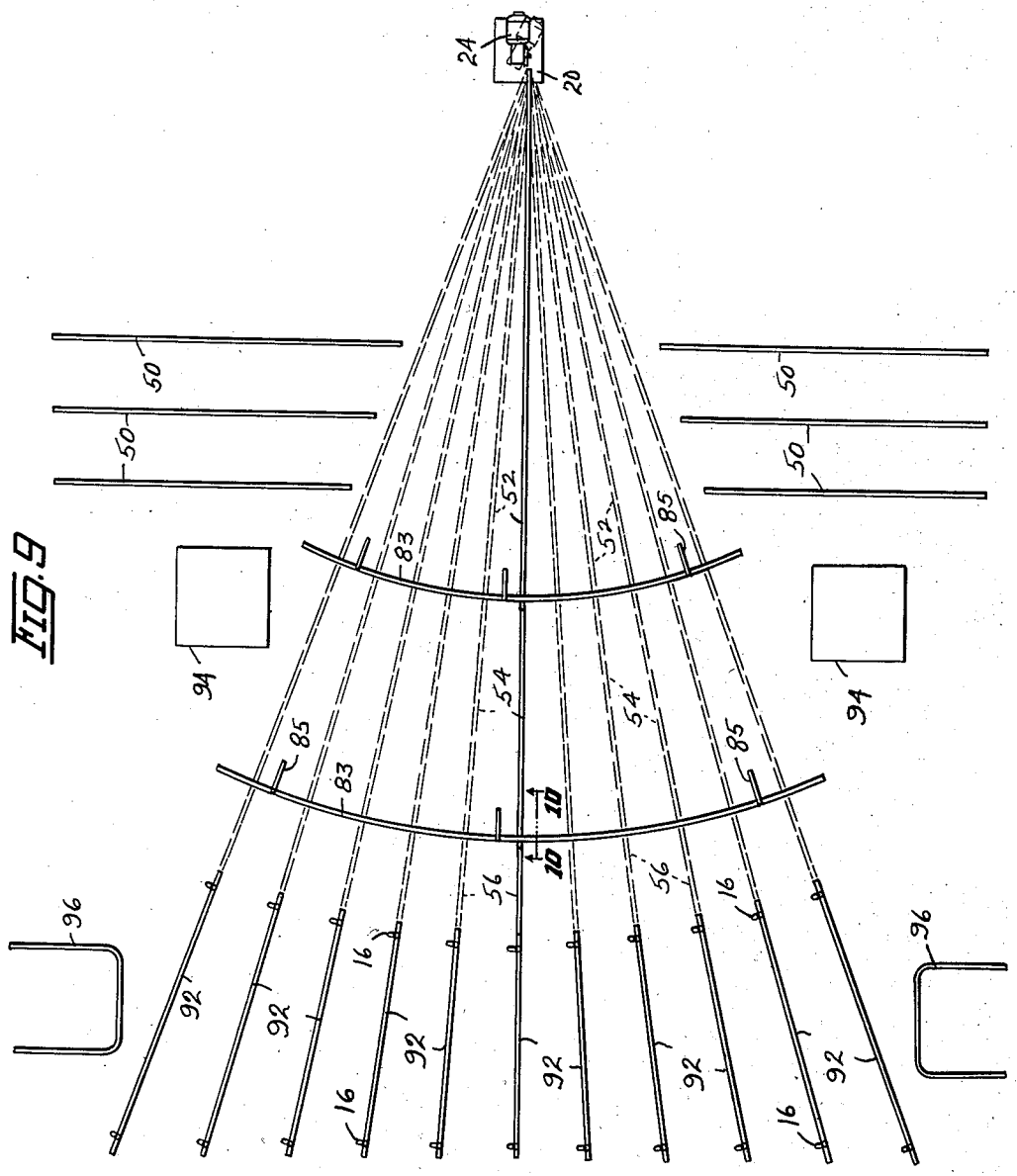
INVENTOR.
GUNNARD D. CARLSON
BY Talbert Dick & Adler
ATTORNEYS.

Aug. 5, 1958  G. D. CARLSON  2,846,049
CLOTHES CONVEYOR
Filed April 19, 1955  5 Sheets-Sheet 5
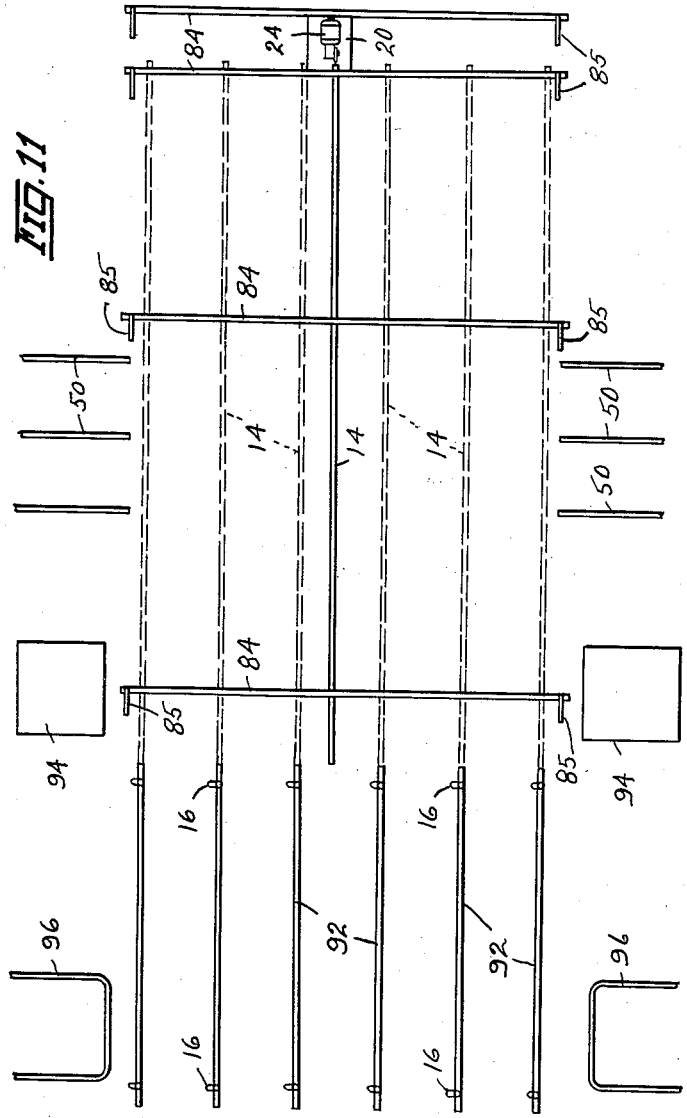
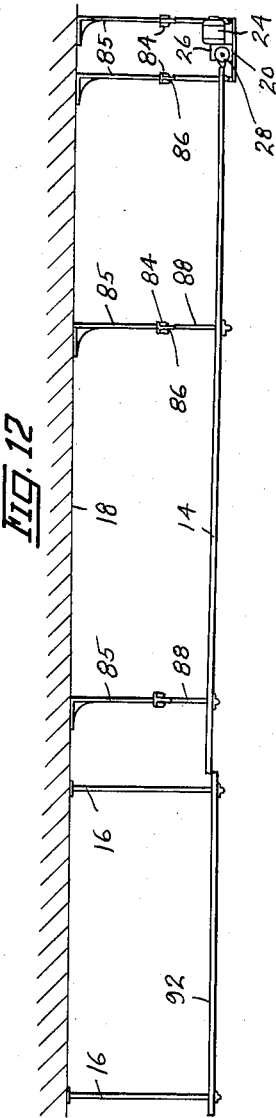
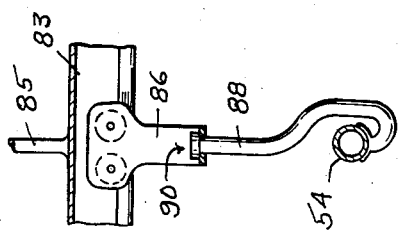
INVENTOR.
GUNNARD D. CARLSON
BY Talbert Dick & Adler
ATTORNEYS.

United States Patent Office 2,846,049
Patented Aug. 5, 1958

2,846,049

CLOTHES CONVEYOR

Gunnard D. Carlson, Sioux City, Iowa

Application April 19, 1955, Serial No. 502,399

11 Claims. (Cl. 198—130)

My invention relates to improvements in clothes conveyors such as may be used by dry cleaning establishments, laundries, garment factories, department stores, and the like.

This invention contemplates not only simplified conveyor means for carrying garments in a straight line, but also provides novel means for changing their direction of travel.

A further important object of this invention is to provide a clothes conveyor having means for selectively positioning a terminal or discharge end to register with different receiving racks or stations.

Another object of this invention is to provide a conveyor of the above class having improved means for switching moving garments to receiving racks at predetermined locations.

Still another object of this invention is the provision of a clothes conveyor having relatively few parts so as to minimize the cost of installation, repairs, and maintenance thereof.

Further objects of my invention embrace simplicity and economy in the manufacture of a new and improved clothes conveyor together with novel means for increasing the range of its usefulness.

These and other objects will be apparent to those skilled in the art.

Figure 1:
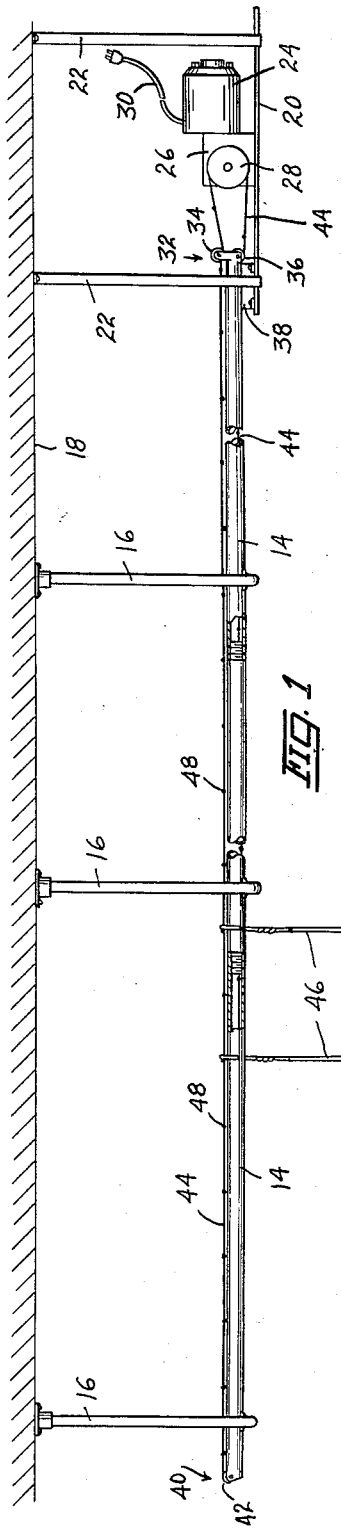
Figure 2:
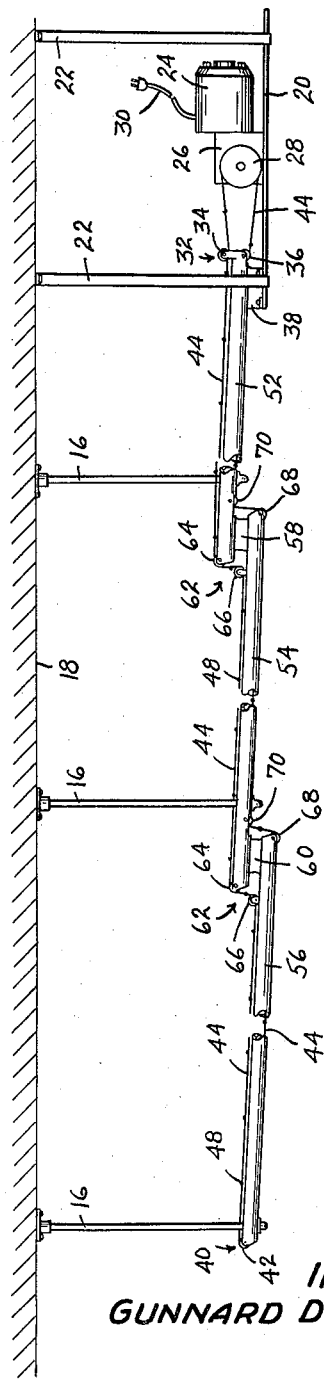

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side elevational view of my clothes conveyor shown supported by ceiling hooks and designed for straight line conveying, Fig. 2 is a side elevational view of my clothes conveyor similar to Fig. 1 but illustrating what I call the drop off construction for use in changing the direction of movement of garments, Fig. 3 is an enlarged perspective view of a right angle turn formed in my conveyor, Fig. 4 is an enlarged top view of a modified right angle turn for this conveyor, Fig. 5 is a side view of the turn arrangement shown in Fig. 4, Fig. 6 is an enlarged top view taken from the line 6—6 in Fig. 3 and broken away to more fully illustrate the construction therein, Fig. 7 is an enlarged fragmentary perspective view of this conveyor illustrating a switch point for moving a garment from the main conveyor line to a receiving rack, Fig. 8 is a cross sectional view taken on the line 8—8 in Fig. 7, Fig. 9 is a plan view illustrating an arrangement of garment racks in a plurality of locations and further showing my conveyor movably mounted whereby its position can be changed, as shown in broken lines, relative to the several racks, Fig. 10 is an enlarged cross sectional view taken on the line 10—10 of Fig. 9 to illustrate the track means to which this conveyor is movably mounted, Fig. 11 is a plan view similar to Fig. 9 but showing the movement of the conveyor in a straight line transversely of its longitudinal axis, Fig. 12 is a side plan view of this conveyor as illustrated in Fig. 11, and Fig. 13 is an enlarged view partly in section taken on the line 13—13 of Fig. 10.

Referring to the drawings the conveyor shown in Fig. 1 comprises a length of tubular material 14 which is preferably a three-quarter inch pipe and is supported by hooks 16 depending from and attached to the ceiling 18 of a room. Pipe 14 will be approximately six feet above the floor though of course this may be varied. Likewise, pipe 14 may be a single length or joined sections to alter its length. The hooks 16 support the pipe 14 from underneath (Fig. 7) to allow movement of garment hangers as will later appear and are a common expedient for supporting elevated members such as pipe 14. In endwise relation to one end of pipe 14 a plate 20 is supported by ceiling hooks or braces 22 and has mounted thereon an electric motor 24 with gear box 26, pulley 28 and lead line 30 for connection to a source of electric power. The inner end of pipe 14 designated 32 being closest to motor 24 carries a pair of vertically spaced pulleys 34 and 36 and the end portion 32 of pipe 14 is rigidly secured to place 20 by a spacer member 38 so that the longitudinal axis of pipe 14 is in alignment with pulley 28. At the outer or terminal or discharge end 40 of pipe 14 there is a pulley 42 in the upper pipe surface. An endless cable, wire, woven cord or the like 44 extends around pulley 28, under pulley 34, over pulley 42 and under pulley 36 so that it moves along the top side of pipe 14 from end 32 to end 40 and returns inside of pipe 14 from end 40 to end 32. The speed of movement of cable 44 is preferably six feet a minute but this can of course be changed in the gear box 26. Garment hangers 46 with garments hung thereon of course, can be placed on pipe 14 over cable 44 and will be carried longitudinally of the pipe as the cable moves. If desired, a plurality of spaced bead like members 48 such as brass spots, crimped fittings or the like can be affixed to cable or wire 44 to hold the hook portions of hangers 46 against sliding especially when pipe 14 is disposed at an angle to the horizontal. For horizontal travel such beads 48 are not necessary but on inclines approximating forty-five degrees they will improve the efficiency of operation. The construction of the conveyor as so far described is exceedingly simple and economically constructed to provide adequate service at prices far below other types of conveyors designed for similar purposes.

Fig. 1 as described is for what I call straight line conveying. That is for a continuous conveying means between two points. In Fig. 2 I have shown a modification of Fig. 1 which permits the delivery of hangers 46 to intermediate stations or racks 50 (Figs. 7, 9 and 11) between conveyor ends 32 and 40 which I shall now describe. Here instead of a continuous length of pipe 14 or pipe sections in endwise alignment as in Fig. 1 I have used a plurality of pipe lengths 52, 54 and 56 arranged in line but in a drop off or step like arrangement as illustrated. Pipes 52 are supported as pipe 14 by ceiling hooks 16 and the drive unit consisting of the motor 24 and its related parts are the same as in Fig. 1 and carry like numerals. Pipe 52 is secured at its inner end to plate 20 by the spacer 38 but has a very slight upward incline toward conveyor end 40. At the outer end of pipe 52 and to the underside is secured the inner end of pipe 54 by means of the spacer 58. Pipe 54 is inclined similarly to pipe 52 and this drop off arrangement can be duplicated as often as necessary as illustrated by pipe 56 and spacer 60. The purpose of the upward inclination of the respective pipe lengths used in Fig. 2 is to maintain the end 40 on substantially the same plane as end 32. A cable or wire 44 travels out over the top surface of the pipes 52, 54 and 56 and returns inside the respective pipes in the same general manner as shown in Fig. 1. However, due to the drop off points designated generally by the numeral 62, pulleys 64 and 66 are provided at the drop off points for the outgoing line, and pulleys 68 and 70 are placed for the return line as shown.

It will be appreciated that the disclosure in Fig. 2 can also be used for straight line conveying as the hangers 46 will drop from one level to another at points 62 which is a relatively short distance as seen in Fig. 8. However, drop off points 62 are designed particularly to receive a switch member 72 (Fig. 7) which is a curved pipe or tube having a diameter at one end the same as the conveyor pipe and tapering to a reduced diameter at the other end. On the wider end of switch 72 a pair of oppositely disposed arms 74 (Fig. 6) project for a frictional slip fit connection with the outer end of the upper pipe at point 62 so that switch 72 becomes in effect a curved extension of the conveyor pipe at point 62. The small end of switch 72 will override one end of a receiving rack 50 as shown. Switch 72 is shaped not only in tapered form as described but preferably leaves the conveyor pipe on a slight downward incline. Also switch 72 preferably has a polished surface to facilitate the sliding of hanger 46. It will thus be understood that cable 44 will carry hanger 46 into contact with switch 72 where because of its shape and relative position, the hanger can easily slide by gravity to rack 50. Switch 72 can be readily inserted or removed as required and can of course be curved in the opposite direction to that shown.

With reference to Figs. 3 and 4 I have shown two arrangements for changing the direction in my main conveyor line. In Fig. 7 the actual conveying cable 44 did not change directions although the hanger 46 does but comes to rest on the rack 50. In Fig. 3 a switch 72 is provided the same as in Fig. 7 but overrides a pipe 75 which is disposed at an angle to the main pipe 52. A curved tubular member or pipe 76 depends from a spacer 78 and has suitable pulleys 80 and 82 for guiding cable 44 as shown. In this way, cable 44 moves over pipe 75 in the same manner as over pipe 52. Switch 72 in Fig. 3 slopes downwardly from the top plane of pipe 52 the same as in Fig. 7 so that hangers 46 will slide by gravity over it from pipe 52 to pipe 75 where they will continue to be moved by cable 44. The same result in effecting a turn is provided by the disclosure in Fig. 4 where a tubular elbow 76 connects the respective portions of the main conveyor line which are positioned in different directions and for purposes of comparison, the portions of the main line in Fig. 4 are given like numerals as in Fig. 3. However, at the point of connection between pipe 52 and elbow 76, cable 44 passes over pulley 64 into elbow 76 and comes out of the elbow at its juncture point with pipe 75 where it is reeved over pulley 79 and moves over pipe 75 as shown. Elbow 76 curves downwardly from pipe 52 as shown in Fig. 5 and preferably has a polished surface to facilitate the movement of hangers 46 between pipes 52 and 75 over the elbow 76 by gravity.

To further increase the versatility and usefulness of my conveyors so far described, reference is had to Figs. 9-13 where I have illustrated means for moving my main conveying line transversely of its longitudinal axis. This is accomplished by the use of overhead tracks, either curved 83 (Fig. 9) or straight 84 (Fig. 11) which operate as follows. The tracks 83 or 84, whichever may be desired, are suspended from the ceiling 18 by brackets 85 (Fig. 10) and a suitable trolley 86 rides in the track in a well known manner. Hooks 88, similar in structure to hooks 16 previously described support the conveyor pipe at their lower end (Fig. 13) and at their upper end are preferably pivotally or swivelly mounted as at 90 to the trolley 86. A plurality of tracks will of course be used if the length of the conveyor line requires it for adequate support and when a curved track 83 is used, motor 24 is pivotally mounted to its base 20. With this arrangement, the main conveyor line shown in solid lines in Fig. 9 can be moved to the broken line positions whereby the end 40 of the conveyor can be made to register with any one of the several receiving racks 92 which are also suspended from the ceiling as shown in Fig. 12. This movement of the main conveyor also makes possible positioning it near receiving racks 50 at the sides and other intermediate stations 94 and 96 where packaging, assembling or other functions may be carried on.

With a straight track 84 (Fig. 11), it will be understood that the motor assembly and its respective supports are also suspended from a trolley so that the entire conveying unit can be moved laterally instead of on a pivot.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my clothes conveyor without departing from the real spirit and purpose of my invention, and it is my intention to cover by my claims, any modified forms of structure or use of mechanical equivalents which may be reasonably included within their scope.

I claim:

1. In a device of the class described, a first tubular member, a second tubular member disposed at an angle to and on a lower plane relative to one end of said first tubular member, means supporting said tubular members in an overhead position, a tubular elbow connecting said tubular members, an endless cable extending first longitudinally on the outer surface of said first tubular member, then into and through said elbow, then longitudinally on the outer surface of said second tubular member and then back through said second tubular member, said elbow and said first tubular member, and means associated with said cable for moving it in the path described.

2. A conveyor for moving garments suspended on a hanger having a hook portion a tubular member, for supporting the hook portion of said hanger means supporting the same in an overhead position, an endless cable extending from one end of said tubular member longitudinally over the outer surface thereof to the other end and returning through said tubular member, said cable passing beneath the hook portion of the garment hanger and being in frictional engagement therewith due to the weight of the garment on said hanger and means associated with said cable for moving it in the path described.

3. A conveyor for moving garments suspended on a hanger having a hook portion a tubular member, for supporting the hook portion of said hanger an overhead track, a trolley on said track, means suspending said tubular member from said trolley, an endless cable extending from one end of said tubular member longitudinally over the outer surface thereof to the other end and returning through said tubular member, said cable passing beneath the hook portion of the garment hanger and being in frictional engagement therewith due to the weight of the garment on said hanger and means associated with said cable for moving it in the path described.

4. A conveyor for moving garments suspended on a hanger having a hook portion comprising, a first tubular member for supporting the hook portion of said hanger, means for supporting the same in an overhead position, a spacer member depending from one end of said first tubular member, a second tubular member for supporting the hook portion of the hanger and arranged as an extension of the first and having one end secured to the lower end of said spacer member to provide a step-like formation, a curved member detachably insertable into the end of said first tubular member at said step-like formation so as to extend on a downward incline therefrom, an endless cable, means arranging said cable to extend longitudinally from one end of said first tubular member over the outer surface thereof, then down said step-like formation, then longitudinally over the outer surface of said second tubular member to the end, then back through said second tubular member and into said first tubular member to its starting point, said cable passing beneath the hook portion of the garment hanger on said first and second tubular member and being in frictional engagement with said hook portion due to the weight of a garment on said hanger and means associated with said cable for moving it in the path described.

5. A device as defined in claim 4 characterized by an overhead track, a trolley on said track, and means suspending said tubular members from said trolley.

6. A conveyor for moving garments suspended on a hanger having a hook portion comprising, a first tubular member for supporting the hook portion of said hanger, means for supporting the same in an overhead position, a spacer member depending from one end of said first tubular member, a second tubular member for supporting the hook portion of the hanger and secured to the lower end of said spacer member, a curved member detachably insertable into the end of said first tubular member nearest said spacer member so as to extend on a downward incline therefrom, a third tubular member, means supporting the same in an overhead position lower than said first tubular member and at an angle to the longitudinal axis thereof, an endless cable, means arranging said cable to move longitudinally over and through said first and third tubular members and under said curved member, said cable passing beneath the hook portion of the garment hanger on said first and second tubular member and being in frictional engagement with said hook portion due to the weight of a garment on said hanger and means associated with said cable for moving it in the path described.

7. A device as defined in claim 2 characterized by a support member, one end of said tubular member pivotally secured to said support member, an arcuate overhead track, a trolley on said track, and means suspending said tubular member from said trolley.

8. A conveyor for moving garments suspended on hangers having hook portions, comprising, a tubular member for supporting the hook portions of said hangers, means designed to be attached to an overhead support for supporting said tubular member, a pulley on each end of said tubular member, an endless strand trained over said pulleys so as to pass in part longitudinally of said tubular member on and adjacent to the outer side thereof and in part longitudinally through said tubular member, said strand passing beneath the hook portions of the garment hangers and being in frictional engagement therewith due to the weight of the garment on the hanger.

9. A device as defined in claim 8 characterized by a plurality of bead members spaced longitudinally on said strand.

10. A device as defined in claim 8 characterized by an overhead track, a trolley on said track, and means suspending said tubular member from said trolley.

11. A device as defined in claim 8 characterized by a support member, one end of said tubular member pivotally secured to said support member, an arcuate overhead track, a trolley on said track, and means suspending said tubular member from said trolley.

References Cited in the file of this patent
UNITED STATES PATENTS

| | | |
|---|---|---|
| 2,536,575 | Seldin | Jan. 2, 1951 |
| 2,573,334 | Hitz | Oct. 30, 1951 |